United States Patent [19]

Forkey

[11] Patent Number: 4,718,750
[45] Date of Patent: Jan. 12, 1988

[54] FLUID SEALED LENS MOUNTING SYSTEM

[76] Inventor: Richard E. Forkey, 175 East Rd., Westminster, Mass. 01473

[21] Appl. No.: 853,631

[22] Filed: Apr. 18, 1986

[51] Int. Cl.$^4$ ............................................. G02B 7/10
[52] U.S. Cl. .................................... 350/255; 350/589
[58] Field of Search ............... 350/255, 252, 247, 257, 350/251, 429, 319, 589

[56] References Cited

U.S. PATENT DOCUMENTS 3,399,015  8/1968  Jacobs ................................ 350/429
3,817,601  6/1974  Colaiace et al. ..................... 350/255

Primary Examiner—John K. Corbin
Assistant Examiner—Loha Ben
Attorney, Agent, or Firm—Pearson & Pearson

[57] ABSTRACT

A lens system comprising a cylindrical carrier for the lens, a body assembly, and a sleeve internally threaded to match external threads of a cylindrical body of the assembly. The lens is carried coaxially inside the carrier which has a helical cam slot and a longitudinal slot. The carrier is held coaxially and slidably within the interior of the cylindrical body. A pin in the body enters the helical slot, and a pin sealed fluid-tight in the sleeve is inserted through a circumferential opening in the cylindrical body and enters the carrier longitudinal slot. The ends of the cylindrical body are sealed fluid-tight with optical windows. The sleeve spans the circumferential opening. The opening and hence the interior of the body assembly is sealed from external fluid by a suitable lubricant between the external threads of the body and the internal threads of the sleeve. By turning the sleeve, the carrier and lens are cammed longitudinally in the body.

10 Claims, 3 Drawing Figures

U.S. Patent    Jan. 12, 1988    4,718,750
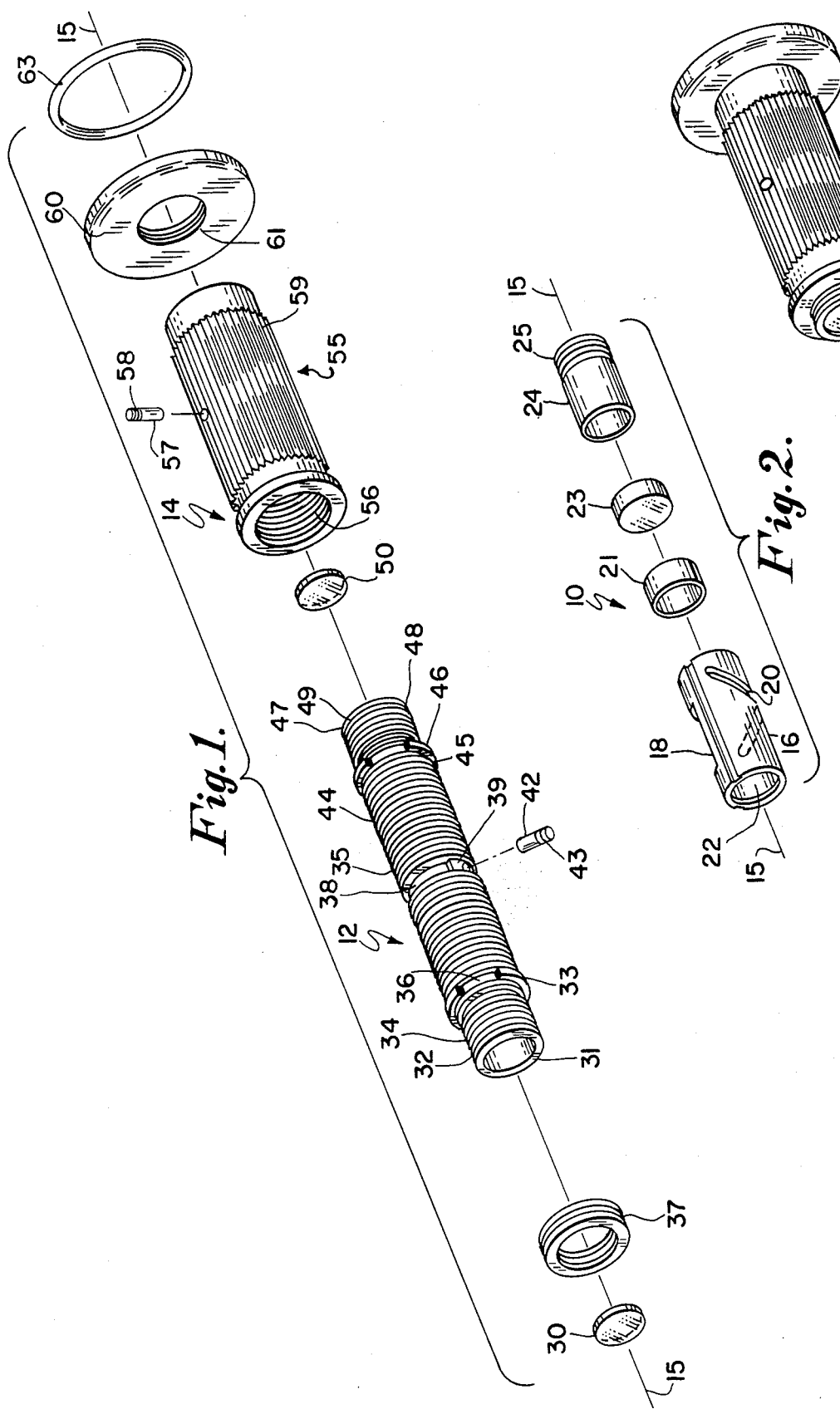

FLUID SEALED LENS MOUNTING SYSTEM

FIELD OF THE INVENTION

The present invention relates to a fluid sealed mounting for use, for example, with optical lens.

BACKGROUND OF THE INVENTION

Various arrangements have been used to provide a mounting for a lens so that the lens may be moved or adjusted axially along the optical axis. For example, U.S. Pat. No. 3,138,060 to Eggert, et al, June 23, 1964 for "Clamping Means for Variable Focal Length Projector Objective Lens" shows how a helical slot in a lens mounting may be used with a pin cammed in the slot to give an axial motion to the lens. U.S. Pat. No. 3,399,015 to Jacobs Aug. 27, 1958 for "Mounting Mechanism for Zoom Magnifier" shows a pin which slides in a camming helical slot, two other slots in which another pin rides, and rotation if a sleeve cams the lens to follow an axial path.

U.S. Pat. No. 4,090,780 to Davis May 23, 1978 for "Linear Objective Adjustment Device for Rifle Scope Collimation" describes a lens mount slidable axially and sealed by an O-ring, or the like, from the atmosphere to retain a nitrogen gas interior.

U.S. Pat. No. 4,269,479 to Hamatani, Jan. 22, 1979 for "Mounting System for Optical Lens Assembly" shows a lens mounting with lubricating means by way of resilient elements.

SUMMARY OF THE INVENTION

According to the invention, a cylindrical carrier carries a lens, the carrier axis and lens optical axis being coincident. The carrier has a longitudinal slot and a helical slot. A body assembly comprises an externally threaded cylindrical body coaxial with the carrier. The body has a circumferential opening. The carrier is mounted within the body for relative slidable motion. Optical windows are sealed at he ends of the body assembly which is sealed from fluid penetration (or emission), except for the circumferential slot or opening. A sleeve internally threaded to match external threads of the body axially spans the body opening. A first internally projecting pin carried by the body enters in and engages one of the slots; a second internally projecting pin sealed to the sleeve penetrates the body opening to enter and engage the other slot. The sleeve is preferably finely threaded so that a lubricant between the threads of sleeve and body of adequate viscosity seals the body from external fluids. Turning the sleeve cams the lens carrier axially, and at the same time, guards the inegrity of the seal from the penetration of external fluids into the body assembly.

BRIEF DESCRIPTION OF THE DRAWINGS

The various objects, advantages and novel features of the invention will be more fully apparent from a reading of the following detailed description when read in connection with the accompanying drawing in which like reference numerals refer to like parts, and in which:

FIG. 1 is a perspective, exploded view of a cylindrical body assembly and a sleeve of an embodiment of the inention; and FIG. 2 is a perspective, exploded view of a carrier of this embodiment of the invention which fits inside the body assembly.

FIG. 3 is an assembled fluid sealed lens mounting system.

DESCRIPTION OF A PREFERRED EMBODIMENT

Referring to the drawing, the illustrative embodiment of the invention comprises a carrier 10, a body assembly 12, and a sleeve 14. These will be assembled coaxially on an axis 15. The carrier comprises a cylindrical wall 16 having a longitudinal slot 18 and a helical slot 20, the slots being substantially diametrically opposed as shown. A spacer 21 fits snugly into the wall 16 and abuts an internal shoulder 22. Against the spacer fits a lens 23 coaxially with and also fitting snugly into the cylindrical interior of the wall 16 abutting th spacer 21. A retainer 24, also cylindrical in shape, fits coaxially into the wall 16. The retainer 24 may have external threads 25 to fit the internal wall 16, or the retainer 24 may be secured with adhesive between wall 16, so that the assembly of spacer 21, lens 23, and retainer 24 are retained with axis 15.

At one end of the body assembly 12, an optical window 30 is cemented in fluid tight relation to the end 31 of the body assembly. The closure portion 32 of the body at each end carries a "quad" ring 33, so-called because it is rectangular (quadrilateral) in cross-section, but serves much the same purpose as an O-ring. Over its mid-section the body 12 bears external threads 44 whch are threaded into internal threads of the cylindrical body 55, and thereby compresses the quad-ring against an internal smooth wall of the cylindrical body in fluid tight relation. A coupler 37 internally and externally threaded may be mounted on the external threads 34 of the body assembly 12 to serve as a coupling flange for external apparatus (not shown).

The cylindrical body 35 is circumferentially slotted as at 38. To maintain its rigidity the body 35 is connected from side to side of the slots 38 by only partially slotting the body 35 and leaving a remaining portion solid as at 39. Into an internally cut helical groove 20 of the cylinrical wall 16 is guided a pin 42, which may be threaded at its outer end 43. The pin 42 projects internally into the body 35 and the cylindrical wall 16. The body 35 is externally threaded along its axial length by external threads 44. At either or both ends of the body assembly 12, and of the body 35, is an external groove 45 to receive a quad-ring 46, compressed by the inside surface of element 55, externally threaded as at 48 to be threaded over external threads along the central section of the body 35. At the distal end 49 of the body assembly 12, there is a closure portion 47 and an optical window 50 is sealed to the closure portion 47 and assembly 12. The optical windows 30 and 50 may be sealed fluid tight by optical cement, or the like, or by any suitable expedient.

The sleeve 55 which may be externally knurled for convenience of manual manipulation as shown is internally threaded by threads 56 along its axial length to be threaded over he external threads 44 of the body 35 as described above. When threaded in place the sleeve 55 spans the circumferential slot or opening 36, as well as the solid remnant 39. An inwardly projecting pin 57 which may be threaded at its outer end as at 58 is screwed or otherwise fastened in fluid-sealed relation as by a suitable cement, to the sleeve 55, through straight grooves 59. Pin 57 projects through slot 38 of body assembly 12 and into longitudinal slot 18 of lens carrier 10.

A flange 60 may have inner threads 61 for coupling to the external threads 48 of body element 35 when in place. The external threads 48 engage internal threads 56 and may then be coupled to an instrument such as a camera, or the like, and when so coupled flange 60 may be drawn against an O-ring 63 for stable and sealed coupling if desired.

The assembly of the optical mounting assembly should be clear from the foregoing description. For example, the lens is first mounted in the carrier 10 by first inserting the spacer 21 in the cylindrical wall 16, then the lens 23, the retainer 24 which is screwed firmly in place to retain the parts. Next, the assembled carrier 10 is placed within the cylindrical body 12 coaxially wih the axis 15. Windows 30 and 50 may then be cemented in place. The pin 42 is inserted in place to engage one of the slots, or grooves in the carrier 10, in this case the helical slot 20. After applying a suitable lubricant to threads 44 and 56, serving both lubricating and vapor fluid sealing functions, the sleeve 55 is screwed onto the body 35 substantially to cover the body 35 completely, and to securely span the circumferential slot 38 and to complete the seal of the quad rings. Next, the pin 57 is entered and sealed in place. The pin 57 engages the other slot, in this case the longitudinal slot 18, passing through the circumferential slot 38 for access. The pins 42 and 57 need only enter the slots 20 and 18, they need not penetrate into the interior of the interior space enclosed by the inside of wall 16. A suitable lubricant is employed, such as vaseline, grease, or the like between the external threads 44 and the internal threads 56, to insure a fluid sealed relation. The threads 44 and 56 to this purpose are of sufficient fineness, for example 48 turns to the inch (TTI) to insure, with the lubricant, a seal against internal-external pressure difference of fluid, for example, of 50 psi or more, against an internal pressure of 50 psi, for example, thus insuring integrity of the sealed interior of the assembly against a pressure differential of 50 psi.

After the assembly of the lens carrier assembly, and of the carrier 10, body assembly 12 and sleeve 14, the entire lens mounting system may be connected to any external system as desired, for example, using coupler 37 at one end, and flange 60 and O-ring 63 at the other end, as desired. The lens 21 may serve as an objective lens. As the sleeve is rotated with one pin in one of the slots and the other pin in the other slot, the carrier 10 will be turned about the axis 15. The pin 57 in the longitudinal slot constrains the cylindrical wall 16, the carrier 10, and the lens 23, to rotate about the axis 15, at the same time as the cam action of pin 42 of the helical slot 20 translates the wall 16, carrier 10, and lens 23 longitudinally along the axis 15.

The system may be charged and sealed with a dry gas such as nitrogen or oxygen, so there is no mass in the ambient atmosphere.

Accordingly, it will be apparent from the foregoing description that there has been described a novel fluid sealed lens mounting that permits easy longitudinal adjustment of a lens, such as an objective lens, well sealed from external fluids, gas or liquid.

I claim:

1. A fluid sealed mounting system for a lens having an optical axis, comprising:
   a cylindrical carrier having a longitudinal axis and carrying the lens, the carrier having an axial slot and a helical cam slot, the lens optical axis and the carrier axis coinciding;
   an externally threaded cylindrical body assembly having a cylindrical body within which the carrier is mounted coaxially with the body for relative slidable coaxial motion, the body being sealed from fluid penetration except for a circumferential opening;
   a sleeve internally threaded to match the external threads of the body and axially spanning the body opening;
   a first internally projecting pin carried by the body and entering in and engaging one of the slots;
   a second internally projecting pin sealed to the sleeve and penetrating the body opening to enter and engage the other slot;
   whereby a rotation of the sleeve and the body cams the carrier axially, and whereby a sealing lubricant between the matching threads of the body and the sleeve completes the seal of the body from external fluid.

2. A fluid sealed system as claimed in claim 1, further comprising a sealing lubricant between the matching threads of the body and the sleeve to seal the body against external fluids.

3. A system as claimed in claim 2, said body having at each axial end can optical window fluid sealed to the body.

4. A system as claimed in claim 4, the seal of the optical windows being affected by optical cement.

5. A system as claimed in claim 1, said lubricant having a viscosity of NLGI (National Lubricating Grease Institute) consistency of #2 or greater.

6. A system as claimed in claim 1, in which the first pin enters the helical slot of the carrier, and the second pin enters the longitudinal slot.

7. A system as claimed in claim 6, said body having at one axial end a sealed closure comprising:
   a cylindrical closure portion;
   one of the optical windows being sealed to one end of the cylindrical portion, the portion having at its other end external threads, said one end of the body being internally threaded to receive the portion external threads, the body having an internal shoulder facing the axial end; and
   a sealing ring, said portion when threaded in place in the one axial end bearing at the other end of the portion against and compressing the sealing ring in sealing relation against the shoulder.

8. A system as claimed in claim 7, said body having at the other axial end a sealed closure comprising:
   a second cylindrical closure portion;
   the other optical window sealed to one end of the second portion, the second portion having at its other end external threadss, said other end of the body being internally threaded to receive the second portion external threads, the body having a second internal shoulder facing the other axial end; and
   a second sealing ring, said second portion when threaded in place in the other axial end bearing at the other end of the second portion against and compressing the second sealing ring in sealing relation against the second shoulder;
   the other optical window being sealed to the other axial end of the body.

9. A system as claimed in claim 1 which is charged with dry gas.

10. A system as claimed in claim 1 in which the first pin enters the longitudinal slot and the second pin enters the helical slot of the carrier.

* * * * *